US010553131B2

(12) United States Patent
Sakezles

(10) Patent No.: US 10,553,131 B2
(45) Date of Patent: Feb. 4, 2020

(54) CENTRAL LINE SIMULATION AND TRAINING DEVICE

(71) Applicant: Christopher Sakezles, Tampa, FL (US)

(72) Inventor: Christopher Sakezles, Tampa, FL (US)

(73) Assignee: SYNDAVER LABS, INC., Tampa, FL (US)

(*) Notice: Subject to any disclaimer, the term of this patent is extended or adjusted under 35 U.S.C. 154(b) by 359 days.

(21) Appl. No.: 15/295,947

(22) Filed: Oct. 17, 2016

(65) Prior Publication Data

US 2017/0103681 A1 Apr. 13, 2017

Related U.S. Application Data

(63) Continuation of application No. 14/200,480, filed on Mar. 7, 2014, now Pat. No. 9,472,122.

(60) Provisional application No. 61/774,166, filed on Mar. 7, 2013.

(51) Int. Cl.
*G09B 23/28* (2006.01)
*G09B 23/30* (2006.01)

(52) U.S. Cl.
CPC ....... *G09B 23/303* (2013.01); *Y10T 29/49826* (2015.01)

(58) Field of Classification Search
USPC ................. 434/262, 267, 268, 272
See application file for complete search history.

(56) References Cited

U.S. PATENT DOCUMENTS

| 6,234,804 B1* | 5/2001 | Yong ................. G09B 23/285 434/267 |
| 8,535,062 B2* | 9/2013 | Nguyen ................. G09B 23/30 434/267 |
| 9,548,002 B2* | 1/2017 | Black ................. G09B 23/285 |
| 9,589,483 B2* | 3/2017 | Buckman ............... G09B 23/28 |
| 9,940,849 B2* | 4/2018 | Hart ........................ G09B 23/30 |
| 2004/0126746 A1 | 7/2004 | Toly |
| 2007/0292829 A1 | 12/2007 | King |
| 2011/0287398 A1 | 11/2011 | Blackburn |
| 2012/0015337 A1 | 1/2012 | Hendrickson |
| 2012/0282584 A1 | 11/2012 | Millon |
| 2012/0288839 A1* | 11/2012 | Crabtree .............. B65D 75/008 434/267 |
| 2013/0078603 A1 | 3/2013 | Yang |

(Continued)

*Primary Examiner* — Kurt Fernstrom
(74) *Attorney, Agent, or Firm* — Timothy H. Van Dyke; Beusse, Wolter, Sanks & Maire PLLC

(57) ABSTRACT

An anatomical simulation training device is disclosed in an embodiment herein. The anatomical device includes an anatomical model comprising a quadrant of a torso. The model includes a first opening and a second opening, wherein a first passageway connects between the first and the second opening. The model further includes a third opening, wherein a second passageway connects between the third opening and the second opening. The first passageway is configured to receive a first conduit, and the second passageway is configured to receive a second conduit. The first and second conduits are removable and replaceable. The model is comprised of, in part or in whole, a hydrogel, and said model quadrant torso mimics at least a portion of a human or non-human animal quadrant torso, and simulates at least one predetermined physical characteristic of a human or non-human animal torso with at least fifty percent or more similarity.

16 Claims, 4 Drawing Sheets

(56) References Cited

U.S. PATENT DOCUMENTS

2013/0109000 A1  5/2013  Nelson
2014/0255967 A1  9/2014  Dancu
2015/0161347 A1  6/2015  Christiansen

* cited by examiner

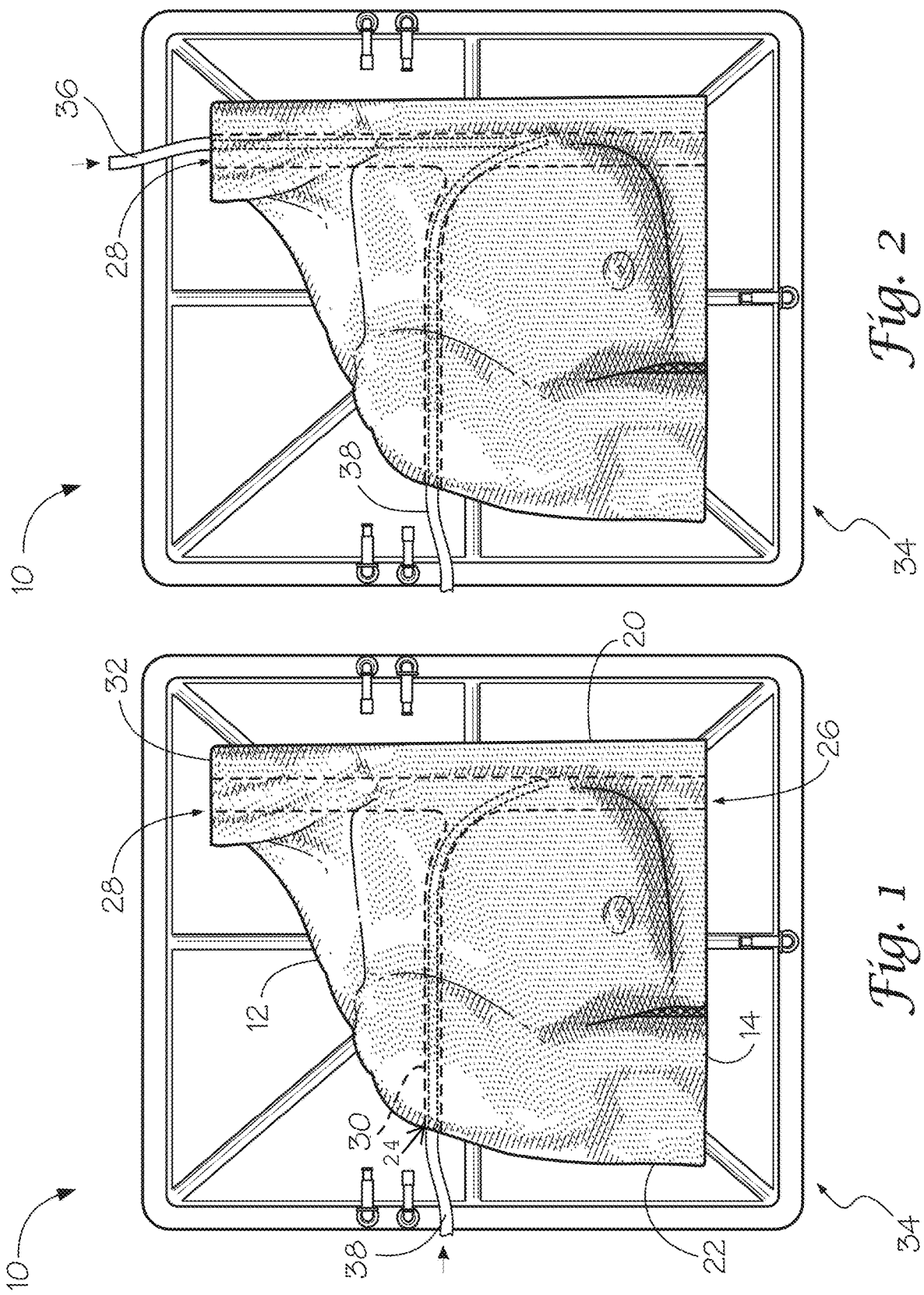

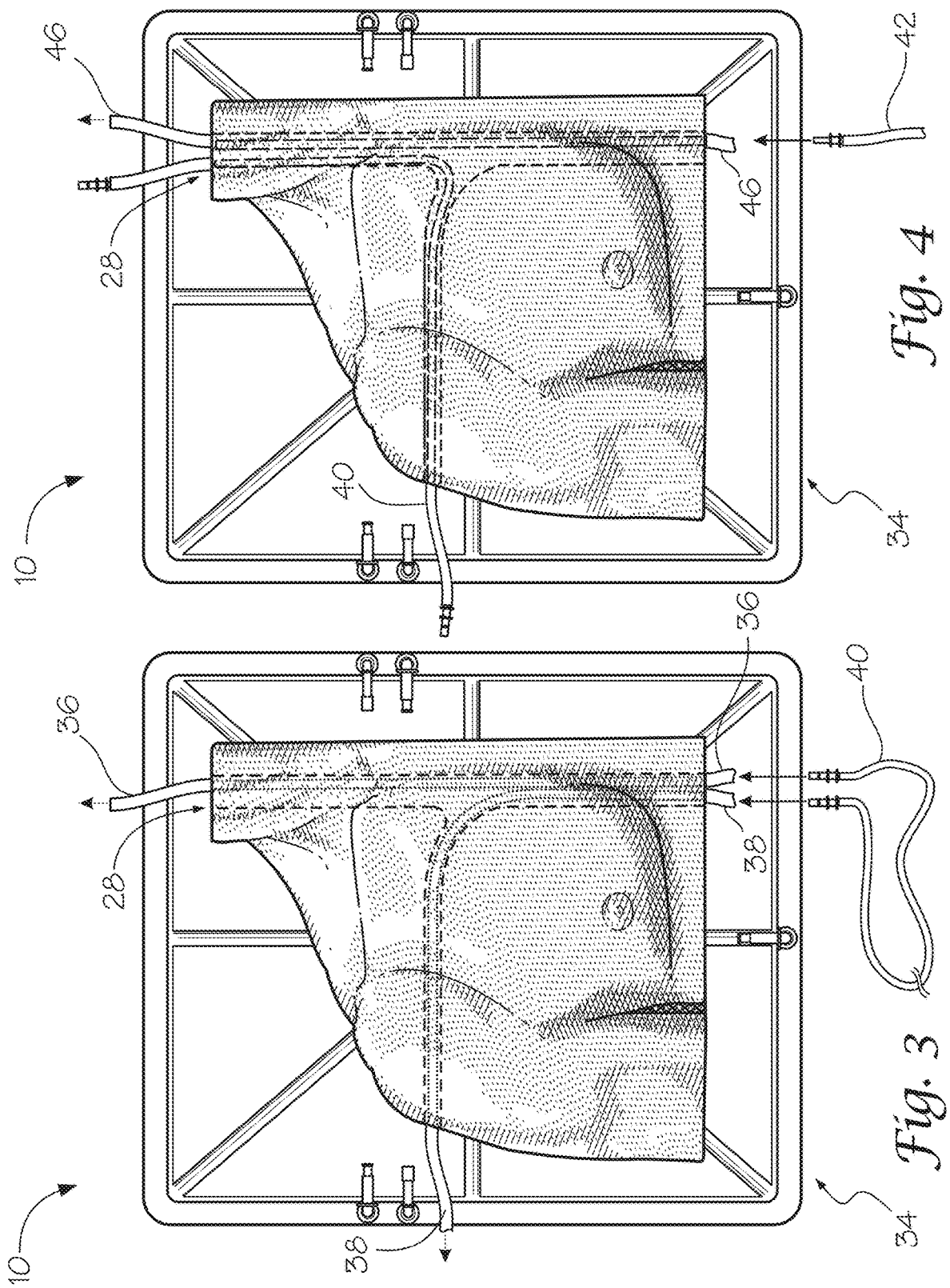

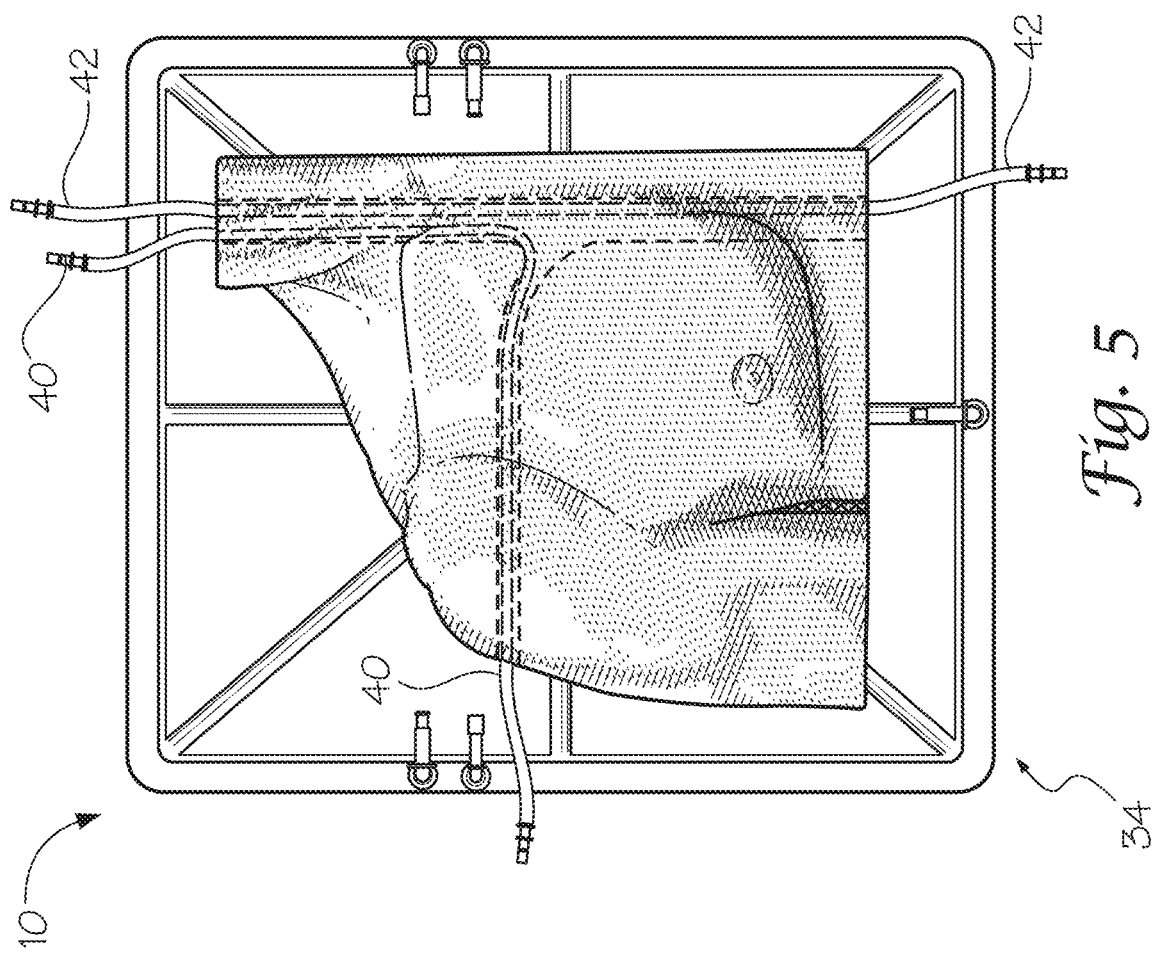

CENTRAL LINE SIMULATION AND TRAINING DEVICE

CROSS-REFERENCE TO RELATED APPLICATIONS

This application is a continuation of U.S. application Ser. No. 14/200,480 filed on Mar. 7, 2014 which is related to U.S. Provisional Application 61/774,166 filed on Mar. 7, 2013. The teachings of these applications are incorporated in their entirety and priority is claimed under 35 USC 119.

BACKGROUND

Anatomical simulators have been developed for training and assessment of medical students, nursing students, medics and practitioners. These simulators have enabled health care professionals of all backgrounds to practice clinical procedures in a safe environment, away from the patient. The majority of simulators that have been developed thus far focus mainly on emergency care, anesthesia and laparoscopic surgery. In addition, simulators have been developed for examination of body cavities.

Various procedures performed in the medical field require significant training and expertise to avoid potential serious complications that can arise if not performed correctly. Risks are associated with any medical procedure, particularly with those which are more invasive. Many medical procedures could improve with improved training devices including needle biopsy or aspiration procedures, endotracheal intubation procedures, and particularly central line procedures. Procedures including inserting a needle or catheter into a central line or arterial line typically require palpation and can be for femoral, subclavian, jugular arteries and the central venous system. In another example, a central venous catheter (CVC or central venous line or central venous access catheter) is a catheter placed into a large vein in the neck, chest or groin, this is inserted by a physician when the patient needs, for example, frequent or intensive cardiovascular monitoring, for assessment of fluid status, and for increased viability of intravenous drugs/fluids. The most commonly used veins are the internal jugular vein, the subclavian vein and the femoral vein. This is in contrast to a peripheral line which is usually placed in the arms or hands. The Seldinger technique is generally employed to gain central venous access. Examples of these devices include Hickman catheters, which require clamps to make sure the valve is closed, and Groshong catheters, which have a valve that opens as fluid is withdrawn or infused and remains closed when not in use.

Regardless of the methods, techniques, or particular materials used, healthcare training is an iterative process and must include opportunities to practice various clinical skills. One of the most important aspects of clinical training is assessment. Assessment allows learners to gauge their level of understanding or performance as compared to their colleagues or a pre-determined standard. Appropriate feedback is critical to mastering hands-on clinical skills. Medical training is the only defense in decreasing clinical errors. Thus, simulators that enhance the training of practitioners for procedures involving direct and indirect contact with patients are desperately needed. Simulators that can reliably and accurately provide feedback to a practitioner as to the quality of their performance are also desirable.

BRIEF DESCRIPTION OF THE DRAWINGS

FIG. 1 provides a front side view of an embodiment of an anatomical model of a quadrant of a torso, wherein a first tubular member is inserted into a first passageway.

FIG. 2 provides a front side view of the anatomical model embodiment of FIG. 1 illustrating the first and second tubular members inserted into the first and second passageways, respectively.

FIG. 3 provides a front side view of the anatomical model embodiment of FIG. 1, with the first and second tubular members fully inserted through the first and second passageways, respectively.

FIG. 4 provides a front side view of the anatomical model embodiment of FIG. 1, wherein the first conduit is disposed within the model, and a third tubular member is disposed within the second passageway.

FIG. 5 provides a front side view of the anatomical model embodiment of FIG. 1, wherein the first and second conduits are disposed within the anatomical model embodiment.

DEFINITIONS

Figure 6:
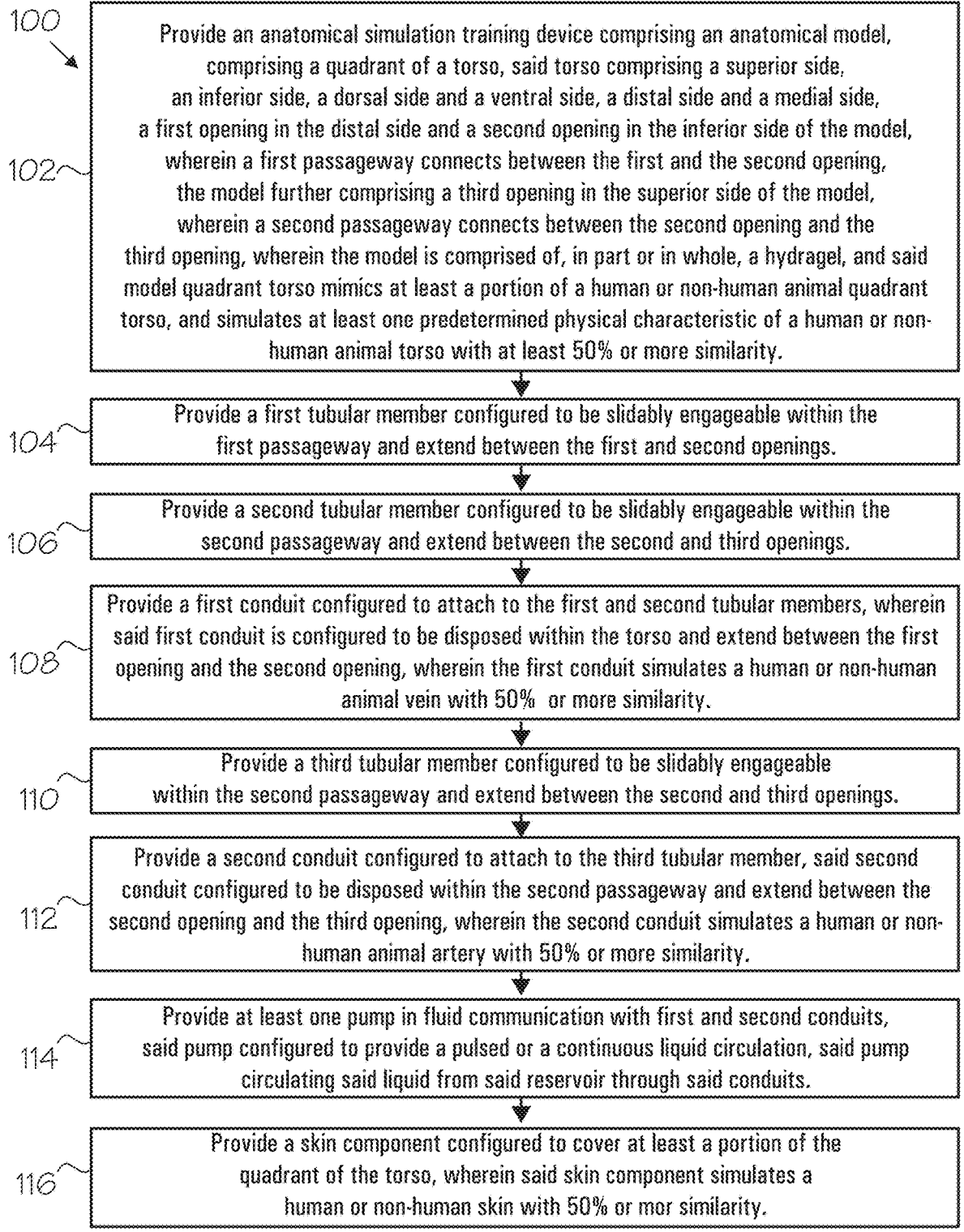
FIG. 6 provides a flow chart illustrating an embodiment of a method of arranging an anatomical simulation central line training device.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the following definitions are provided.

The terms "anatomic(al) teaching model", "anatomic(al) model", "training device" and "model training device" are used interchangeably, herein.

The term "hydrogel(s)" as used herein refers to a unique class of materials that contain a large amount of water and generally exhibit a high degree of elasticity and lubricity. These materials are ideal for simulating the physical properties of many living soft tissues. Hydrogels are materials that are wetable and swell in the presence of moisture and retain water without dissolving. These materials are generally constructed of one or more hydrophilic polymer molecules, although copolymerization with hydrophobic monomers may also lead to the formation of a hydrogel. These materials are generally elastic, and exhibit a three-dimensional network that is either crosslinked directly by chemical bonds or indirectly through cohesive forces such as ionic or hydrogen bonding.

The tissues and structures that "are comprised of, in part or in whole, a hydrogel," aside from hydrogel materials, may include, but are not limited to, hydrophillic polymers, interpenetrating or semi-interpenetrating polymer networks, fibers, silicone rubber, natural rubber, other thermosetting elastomers, other thermoplastic elastomers, acrylic polymers, other plastics, ceramics, cements, wood, styrofoam, metals, actual human tissues, actual animal tissues, and any combination thereof. For model embodiments comprising one or more components, each component part may be constructed from one or more tissue analog materials.

The luminal structures, fat tissue, muscular tissue, skin tissue, bone and organs are formulated to simulate one or more physical characteristics of a target living tissue. These physical characteristics include, but are not limited to, uni-axial or multi-axial tensile strength or modulus, uni-axial or multi-axial compressive strength or modulus, shear strength or modulus, coefficient of static or dynamic friction; surface tension; elasticity; wettability; water content; electrical resistance and conductivity; dielectric properties; optical absorption or transmission, thermal conductivity, porosity, moisture vapor transmission rate, chemical absorption or adsorption; or combinations thereof. Each tissue or structure is designed so that one or more of its physical characteristics will sufficiently match the corresponding physical characteristic(s) of the relevant tissue on which the tissue or luminal structure is based. More specifically, each tissue analog material is preferably formulated so that the physical characteristic(s) of the tissue analog fall within a range that is no more than 50% lesser or greater than the targeted physical characteristic(s) of the relevant living tissue on which the tissue analog material is based.

The aforementioned listed physical characteristics are well understood, and may be determined by well-established techniques. References teaching the determination of different physical characteristics (in no way intended to be an exhaustive list) include the following:
(1) Shigley, J. E., and Mischke, C. R. *Mechanical Engineering Design*, 5$^{th}$ Ed., McGraw-Hill, 1989.
(2) Harper, C. A., *Handbook of Materials for Product Design*, 3$^{rd}$ Ed., McGraw-Hill, 2001.
(3) Askeland, D. R., *The Science and Engineering of Materials*, 2$^{nd}$ Ed., PWS-Kent, 1989.
(4) LaPorte, R. J., *Hydrophilic Polymer Coatings for Medical Devices*, Technomic Publishing, 1997
(5) Hayt, W. H., and Kemmerly, J. E., *Engineering Circuit Analysis*, 4$^{th}$ Ed., McGraw-Hill, 1986.
(6) Park, J. B., and Lakes, R. S., *Biomaterials, An Introduction*, 2$^{nd}$ Ed., Plenum Press, 1992.
(7) Lindenburg, M. R., Editor, *Engineer in Training Manual*, 8$^{th}$ Ed., Professional Publications, 1992.

Other references of note that are incorporated herein are Ottensmeyer et al., "The Effects of Testing Environment on the Viscoelastic Properties of Soft Tissues, Proceedings of Medical Simulation," International Symposium-ISMS 2004, Cambridge, Mass., Jun. 17-18, 2004 and references cited therein; and Brouwer et al. "Measuring in Vivo Anaimal Soft Tissue Properties for Haptic Modeling in Surgical Simulation", *Proc. Medicine Meets Virtual Reality*, Newport Beach, Calif., IOS Press, 2001, and references cited therein.

Particular teachings of certain physical characteristics are noted (references numbers related to preceding list):
Tensile strength and modulus, both measured in Pascal (Pa)—Ref 1, pg 186.
Compressive strength and modulus, both measured in Pascal (Pa)—Ref 2, pg 718.
Shear strength and modulus, both measured in Pascal (Pa)—ASTM Standard D3165-00, Standard Test Method for Strength Properties of Adhesives in Shear by Tension Loading of Single-Lap-Joint Laminated Assemblies.
Coefficient of static and dynamic friction, a dimensionless number—Ref 7, pg 445.
Surface tension, measured in dynes/cm—Ref 6, pg 57.
Wettability, measured in terms of contact angle (degrees)—Ref 4, pg 3.
Water content, measured in mass percent (%)—Ref 4, pg 41.
Electrical resistance and conductance, measure in ohm for resistance and mho for conductance—Ref 5, pg 25.
Dielectric properties, measured in various units—ASTM Standard E2039-04 Standard Test Method for Determining and Reporting Dynamic Dielectric Properties.
Optical absorption and transmission, measured in $cm^{-1}$—Ref 3, pg 739.
Thermal conductivity, measured in cal/(cm-s-C)—ASTM Standard D5930-01 Standard Test Method for Thermal Conductivity of Plastics by Means of a Transient Line-Source Technique.
Porosity, measured in volume percent (%)—Ref 3, pg 490.
Moisture vapor transmission rate, measured in $g/(mil-in^2)$—Ref 2, pg 941.

The term "artificial" as used herein to describe an anatomic model refers to a model that is either synthetically manufactured or naturally manufactured in vivo and assembled with model components. In the case of naturally manufactured artificial components, this may refer to actual tissues or anatomical structures procured from a cadaveric human or from a nonhuman subject that are removed from the subject processed and assembled with other artificial components.

The term "geometrically mimic" as used herein refers to a comparative relationship of a configuration of an artificial anatomical model, and/or artificial structural component thereof, with a target anatomical structure wherein such configuration comprises one or more similar geometric features of the target anatomical structure to be mimicked, such as length, width, diameter, thickness, cross-section, and/or, in most cases general shape of a particular target anatomical structure.

The term "human or non-human animal tissue" as used herein refers to the one or more tissues that constitute a human or non-human animal anatomical structure. "Anatomic structures" may include tissue types, bone types, organ types, and/or part of organ(s).

As used herein the term "human or non-human animal anatomical structure" refers to one or more tissue structural components that make up a part of anatomy of a human or non-human animal. A part of anatomy may include, but is not limited to, whole organs, parts of an organ, or a section of a body comprising one or more tissue types, organ types, and/or part of organ(s).

DETAILED DESCRIPTION

There is much interest in the development of anatomic models with components that simulate those of a human with significant similarity for use in education, training, and practice of students and professionals. More preferably, an anatomic model with easily removable and replaceable anatomic structures is essential to a successful learning environment. The model embodiments of the subject invention may serve as a highly sophisticated testing and learning system enabling a surgeon or medical student to optimize instrumentation and surgical approaches for a particular procedure before having to perform the procedure on a live patient.

Typical engineering materials, including many metals, ceramics, and plastics commonly employed in industry may be used in creating the models described herein depending on the required analog properties. However, in cases where soft tissues are being modeled it will generally be advantageous to use nonstandard materials such as hydrogels. These materials swell in the presence of moisture and can retain large amounts of water without dissolving. They are constructed of one or more hydrophilic polymer molecules, although copolymerization with hydrophobic monomers may also lead to the formation of a hydrogel. These materials are generally elastic, and exhibit a three-dimensional network that is either crosslinked directly by chemical bonds or indirectly through cohesive forces such as ionic or hydrogen bonding. Hydrogels are particulary advantageous in this application because the formula may be manipulated to give a combination of water content, lubricity, abrasion resistance, and other properties characteristic of living soft tissues. In this respect these materials are particularly suited to modeling tissues such as fat or muscular tissues in addition to skin tissues. Hydrogels also provide an ideal substrate for maintaining a surface of live cells if so desired.

In exemplary embodiments, the models or devices comprise structures such as muscles, fat layers and skin layers that are made of hydrogel materials. The models provide an effective teaching and training device, due to their similarity to real tissues, organs, and organ systems, as well as the simplicity in the replacement of parts or components which may be damaged or used during the training. In certain embodiments, the components of the models are replaceable independently of one another, providing a substantial cost-saving feature over current teaching devices in the field which require replacement of an entire teaching model or costly, larger portions of the model.

One important feature of certain embodiments of the subject invention is the implementation of synthetic materials that can simulate one or more physical properties of living tissues. These materials are in most cases the hydrogel materials that are designed on the basis of physical tests performed on actual living target tissues. For example, a particular analog material might be designed to exhibit a tensile strength close to 10 kPa to mimic a target tissue that exhibits a tensile strength of 10 kPa. One or more components made from these materials are then assembled into a configuration that mimics both the size and geometry of the target anatomic structure.

The models of the subject invention may employ a wide variety of hydrogel materials, including but not limited to polyvinyl alcohol, polyvinyl pyrrolidone, polyethylene oxide, polyhydroxyethyl methacrylate; polyethylene glycol, hyaluronic acid, gelatin, carrageen, alginates, chondroitan sulfate, dermatan sulfate (and other proteoglycans). This entire class of materials is physically more tissue-like simply by nature of incorporating water, but by carefully controlling such parameters as molecular structure, density, wall thickness, durometer, and many other physical properties and characteristics a good match between the actual tissue and analog material may be achieved.

Poly (vinyl alcohol) is normally produced by the acid-catalyzed hydrolysis of poly (vinyl acetate), which effectively converts the pendant acetate groups to hydroxyl groups. The properties of the resulting polymer are determined by tacticity, degree of hydrolysis, and molecular weight. Most commercial grades of PVA are stereoregular (primarily isotactic) with less than 2% of the repeat units forming in the 'head-to-head' (adjacent hydroxyl groups) configuration. In theory this should allow a high degree of crystallinity in the finished product. However, this is hindered by the presence of residual acetate groups so the tendency toward crystallization depends primarily on the degree of hydrolysis. This refers to the percentage of converted acetate groups on the main chain. Partially hydrolyzed grades (less than 75% conversion) do not crystallize significantly and are soluble in water at room temperature. This is because the large number of bulky acetate groups increases free volume and prevents the long-range interchain associations required for crystallization to occur. As the degree of hydrolysis increases the loss of bulky acetate groups reduces free volume and the chains are allowed to more closely approach one another. The compact but highly polar hydroxyl groups then come into close proximity and 'bind' the chains together through strong hydrogen bonding. These interchain forces increase the degree of crystallinity and greatly reduce solubility. In fact, in spite of the high concentration of hydroxyl groups completely hydrolyzed grades of PVA should be heated to nearly 100 C to attain solution. These materials exhibit excellent mechanical properties and chemical resistance and also swell to a significant degree.

The properties of PVA hydrogels vary with molecular weight, but since these materials are normally obtained in polymer form the molecular weight cannot easily be adjusted. Instead these properties are typically modified by means of chemical or physical crosslinking. Chemical gels are easily formed by the addition of agents which undergo condensation with the hydroxyl groups on the main chain. A number of aldehydes (glutaraldehyde, formaldehyde, etc.), dicarboxylic acids (adipic acid, terephthalic acid, etc.), and metal ions ($Fe^{3+}$, $B^{5+}$, etc.) will form chemical bonds with PVA which result in crosslinks. Longer molecules such as diacids are generally preferred over metal ions because the ion 'bridge' is short and restrictive, embrittling the material. Molecules such as adipic acid can effectively restrict chain mobility while maintaining some measure of flexibility.

The orientation of a given gel material may be induced by drawing the material, by heat treatment, or by casting the polymer in solution with a gelling agent. These agents create specific interactions between the hydroxyl groups on adjacent chains, bringing them together to improve hydrogel bonding. Many such agents are known, and this process is easily employed on a laboratory scale.

The models of the subject invention are characterized by a similarity of geometry, of individual component physical properties, and of component-to-component interfacial properties with living tissue. On the simplest level, individual model components are fabricated such that they mimic the geometry of a particular target anatomy.

The geometric data needed for fabrication is typically obtained in two ways. The traditional approach is to obtain data from the literature on morphology or from cadaver measurements. While not a bad approximation, this method is time-consuming and permits a large degree of error. A better method would be to obtain the geometric data directly from a patient.

After collecting the appropriate geometric data, the individual model components may be fabricated from appropriate analog materials. Depending on the complexity of the part and the type of materials used, the individual component might be molded, extruded, or machined. The models of the subject invention are constructed from multiple components, and these individual components are fabricated in such a way that they mimic the geometry (length, width, diameter, thickness, cross-section, shape, etc) of a particular portion of the target anatomy.

The individual components of the subject invention are assembled in such a way that the interaction between adjacent components yields the overall interaction expected in the actual target tissue. That is, the interfacial properties (bond strength, component-to-component friction, etc) between the various model components are designed to simulate the interaction between the relevant tissues in the target anatomy.

Accordingly, an anatomical simulation training device is provided. The anatomical device includes an anatomical model 10 including a quadrant of a torso with a superior side 12, an inferior side 14, a distal side 22 and a medial side 20 as shown in the frontal view of an embodiment of the device in FIG. 1. The model 10 includes a first opening 24 in the distal side 22 and a second opening 26 in the inferior side 14 of the model 10, wherein a first passageway 30 connects between the first opening 24 and a second passageway 32. The second passageway 32 connects between a third opening 28 in the superior side 12 of the model 10 and the second opening 26. The first passageway 30 is configured to receive a first tubular member 38, and the second passageway 32 is configured to receive a second tubular member 36. A portion of the second passageway 32 which extends from the first passageway 30 to the inferior side 14 of the model 10 is configured to receive both the first and second tubular members 38, 36, in an embodiment.

The model 10 is comprised of, in part or in whole, a hydrogel, and the model 10 quadrant of the torso mimics at least a portion of a human or non-human animal quadrant torso, and simulates at least one predetermined physical characteristic of a human or non-human animal torso with at least fifty percent or more similarity, in one embodiment. The anatomical model 10 also includes simulated fat tissue, muscle tissue, skin tissue, organs, bones and luminal structure of the torso of a human or non-human animal geometrically, and wherein one predetermined physical characteristic of a human or no-human animal torso is simulated with at least fifty percent or more similarity.

The anatomical simulation training device further includes a pump 34 in communication with the model 10, wherein the pump 34, in some embodiments, may comprise or may be formed as a base to support the model. The pump 34 may be battery powered in some embodiments. One or more pumps 34 are provided in an embodiment of the invention. In one embodiment, a peristaltic pump is provided to control the flow of fluid on the arterial side. Arterial flow occurs from the heart to the neck and out to the arm or distal side of the model. Another type of pump provided is a steady flow pump for the flow of fluid on the venous side. Venous flow is from the neck and arm toward the heart. In one embodiment, both a peristaltic pump and a steady flow pump are associated with the anatomical simulation training device. Any other type of pump known to those of skill in the art may be provided in conjunction with the training device herein. Non-limiting examples of peristaltic pumps are provided in EPO422855A1, EP1135609A2, and US 2013/0209275A1. Other types of pumps which may be used include those provided in WO2013102236A1, EP0291510A4, WO2003008102A1, and WO2012054490A1, in non-limiting examples.

The anatomical simulation training device further includes a first conduit 40, wherein the first conduit 40 is configured to be disposed in the first passageway 30 and a portion of the second passageway 32 between the third opening 28 and the first passageway 30, wherein the first conduit 40 connects between the first opening 24 and the third opening 28 of the model 10. The device includes a second conduit 42, wherein the second conduit 42 is configured to be disposed in the second passageway 32 such that the second conduit 42 connects between the third opening 28 and the second opening 26 of the model 10. In one embodiment, the first passageway 30 is configured to receive a first tubular member 38, and the second passageway 32 is configured to receive a portion of the first tubular member 38 and the second tubular member 36 between the first passageway 30 and the inferior side 14 of the model 10. The first and second tubular members 38, 36 are provided for placement of the first conduit 40 within the model 10 in an embodiment. In one embodiment, once the first and second tubular members 38, 36 are placed within the first and second passageways 30, 32, as shown in the frontal view of FIG. 2. As demonstrated in FIG. 3, the first and second ends of the first conduit 40 can be connected to the second ends of the first and second tubular members 38, 36, respectively. The first and second tubular members 38, 36, may then be removed from the model 10 through the first and third openings 24, 28, and removed from the first and second ends of the first conduit 40 such that the first conduit 40 remains in the model 10 between the first opening 24 and the third opening 28 as shown in the frontal view of FIG. 4.

In a further embodiment, there may be an additional opening in the superior side 12 of the device, configured to receive a third tubular member 46 for placement of the second conduit 42 there within. Alternatively, the third tubular member 46 can be passed through the third opening 28 into the second passageway 32 and out through the second opening 26, as shown in FIG. 4, and connected to the second conduit 42. The third tubular member 46 can then be removed from the second passageway 32 through the third opening 28. In this manner, the second conduit 42 can be inserted within the second passageway 32, in an embodiment, as shown in FIG. 5. The third tubular member 36 can then be removed or detached from the second conduit 42 so that the second conduit 42 remains within the anatomical model 10 in the second passageway 32 between the second opening 26 and the third opening 28.

In one embodiment, the first and/or second conduits 40, 42 can be connected to the one or more pumps 34 of the device. In this manner, a liquid may be pumped through the first and second conduits 40, 42 to further simulate the features of a human torso. In an embodiment, the first and second conduits 40, 42, are artificial anatomical structures configured to geometrically mimic vasculature, and each conduit 40, 42 further comprises a luminal structure including a first analog material disposed along an inner luminal wall surface of the luminal structure. The first material analog having a structural integrity simulating at least one predetermined characteristic of an inner surface of the vasculature, and a liquid reservoir adapted to hold a liquid. In yet a further embodiment, the liquid comprises a color simulating an appearance of blood and/or the viscosity of blood. In most embodiments, the liquid or fluid simulates both the appearance, including color, and the viscosity of blood.

The conduits 40, 42 are each replaceable independently of one another and independently of the model 10. The model 10 can be provided such that a replacement skin portion can be placed over the top of the torso quadrant, and can be replaced after each use. This replacement skin is replaceable independent of other parts of the model 10.

In another embodiment, a pump 34 is in fluid communication with the luminal structures, wherein the pump 34 causes a pulsed or continuous liquid circulation, the pump 34 circulating the liquid from the reservoir through the luminal structures.

In a further embodiment, the luminal structure further includes a second analog material disposed along an outer surface of the conduit. The second analog material is comprised of a structural integrity simulating predetermined characteristics of an outer surface of the vasculature.

In yet another embodiment, the model 10 includes at least one luminal structure comprising an analog material that simulates at least one predetermined physical characteristic of an inner luminal surface of a lumen possessing human or nonhuman animal anatomical structure.

In one embodiment, the first conduit 40 simulates a human or non-human animal vein with 50% or more similarity. In another embodiment, the second conduit 42 simulates a human or non-human animal artery with 50% or more similarity. Some of the properties of the conduit which establish the simulated human or non human animal vein or artery with 50% or more similarity in the conduit herein include simulated tensile modulus in the axial and radial direction, coefficient of friction, and puncture resistance. Other such properties are also simulated; however these are only examples of those which are provided.

FIG. 6 provides a diagram illustrating a method 100 of arranging an anatomical simulation central line training device, providing an anatomical simulation training device including an anatomical model wherein the anatomic model includes a quadrant of a torso 102. The torso includes a superior side, an inferior side, a distal side and a medial side, a first opening in the distal side and a second opening in the inferior side of the model. A first passageway connects between the first and the second opening. The model further includes a third opening in the superior side of the model, wherein a second passageway connects between the second opening and the third opening, wherein the model is comprised of, in part or in whole, a hydrogel. The quadrant of the torso mimics at least a portion of a human or non-human animal quadrant torso and simulates at least one predetermined physical characteristic of a human or non-human animal torso with at least fifty percent or more similarity.

The method further includes providing a first tubular member configured to be slidably engageable within the first passageway and extend between the first and second openings 104, providing a second tubular member configured to be slidably engageable within the second passageway and extend between the second opening and the third opening 106, and providing a first conduit configured to attach to the first and second tubular members, wherein the first conduit is configured to be disposed within the torso and extend between the first opening and the second opening 108, wherein the first conduit simulates a human or non-human animal vein with 50% or more similarity. The method further includes providing a third tubular member configured to be slidably engageable within the second passageway and extend between the second and third openings 110, and providing a second conduit configured to attach to the third tubular member 112, said second conduit configured to be disposed within the second passageway and extend between the second opening and the third opening, wherein the second conduit simulates a human or non-human animal artery with 50% or more similarity.

In an embodiment, the first and second conduits are artificial anatomical structures configured to geometrically mimic vasculature, and each conduit further comprises a luminal structure comprising a first analog material disposed along an inner luminal wall surface of said luminal structure, said first material analog having a structural integrity simulating at least one predetermined characteristic of an inner surface of said vasculature, and a liquid reservoir adapted to hold a liquid.

The method further includes providing at least one pump in fluid communication with said first and second conduits 114, the pump configured to provide a pulsed or a continuous liquid circulation, wherein the pump circulates the liquid from the reservoir through the conduits.

In an embodiment, the at least one pump includes a peristaltic pump. In another embodiment, the at least one pump includes a steady flow pump. In still another embodiment, the method includes providing a skin component configured to cover at least a portion of the quadrant of the torso 116, wherein said skin component simulates a human or non-human animal skin with 50% or more similarity.

What is claimed is:

1. An anatomical simulation training device comprising:
   an anatomical model comprising at least a quadrant of a torso, having a superior side, an inferior side, a distal side and a medial side, the model comprising a first opening in the distal side, a second opening in the inferior side, and a third opening in the superior side of the model, wherein a first passageway connects between the first opening and a second passageway, wherein the second passageway connects between the third opening in the superior side of the model and the second opening;
   a first tubular member slideably engageable within the first passage way and extend between the first and second openings;
   a second tubular member slideably engageable within the second passageway and extends between the second opening and the third opening;
   a first removable conduit disposed between the first opening and the third opening of the model;
   a second removable conduit disposed between the third opening and the second opening of the model; and
   wherein the model is comprised of, in part or in whole, a hydrogel, and said model quadrant torso mimics at least a portion of a human or non-human animal quadrant torso.

2. The anatomical simulation training device of claim 1, further comprising at least one pump in communication with the model.

3. The anatomical simulation training device of claim 2, wherein the at least one pump comprises a base to support the model.

4. The anatomical simulation training device of claim 2, wherein the at least one pump is battery powered.

5. The anatomical simulation training device of claim 1, wherein the first conduit is an artificial anatomical structure configured to geometrically mimic vasculature, and the first conduit further comprises a luminal structure comprising a first analog material disposed along an inner luminal wall surface of said luminal structure, said first material analog having a structural integrity simulating at least one predetermined characteristic of an inner surface of said vasculature, and further comprising a liquid reservoir adapted to hold a liquid.

6. The anatomical simulation training device of claim 1, wherein the second conduit is an artificial anatomical structure configured to geometrically mimic vasculature, and the second conduit further comprises a luminal structure comprising a first analog material disposed along an inner luminal wall surface of said luminal structure, said first material analog having a structural integrity simulating at least one predetermined characteristic of an inner surface of said vasculature, and further comprising a liquid reservoir adapted to hold a liquid.

7. The anatomical simulation training device of claim 5, wherein at least one pump is in fluid communication with said luminal structure, said at least one pump causing a pulsed or continuous liquid circulation, said pump circulating said liquid from said reservoir through said luminal structure.

8. The anatomical simulation training device of claim 6, wherein at least one pump is in fluid communication with said luminal structure, said at least one pump causing a pulsed or continuous liquid circulation, said pump circulating said liquid from said reservoir through said luminal structure.

9. The anatomical simulation training device of claim 5, wherein said luminal structure further comprises a second analog material disposed along an outer surface of said conduit, said second analog material comprised of a structural integrity simulating predetermined characteristics of an outer surface of said vasculature.

10. The anatomical simulation training device of claim 6, wherein said luminal structure further comprises a second analog material disposed along an outer surface of said conduit, said second analog material comprised of a structural integrity simulating predetermined characteristics of an outer surface of said vasculature.

11. The anatomical simulation training device of claim 1, wherein said liquid comprises a color and/or viscosity simulating an appearance of blood.

12. The anatomical simulation training device of claim 1, wherein the model comprises at least one luminal structure comprising an analog material that simulates at least one predetermined physical characteristic of an inner luminal surface of a lumen possessing human or nonhuman animal anatomical structure.

13. The anatomical simulation training device of claim 2, wherein the at least one pump comprises a peristaltic pump.

14. The anatomical simulation training device of claim 2, wherein the at least one pump comprises a steady flow pump.

15. The anatomical simulation training device of claim 1, further comprising a skin component, wherein said skin component simulates a human or non-human animal skin with 50% or more similarity, wherein the skin component covers at least a portion of the quadrant of the torso.

16. The anatomical simulation training device of claim 15, wherein the skin component is removable and replaceable.

* * * * *